(12) United States Patent
Wagoner et al.

(10) Patent No.: US 10,206,269 B2
(45) Date of Patent: Feb. 12, 2019

(54) SYSTEM FOR COMMISSIONING ELEMENTS IN AN INSTALLATION

(71) Applicant: LSI Industries Inc., Cincinnati, OH (US)

(72) Inventors: Mark Van Wagoner, Cincinnati, OH (US); Robin Tim Frodsham, Portland, OR (US); Mike Hagen, Cincinnati, OH (US)

(73) Assignee: LSI Industries, Inc., Cincinnati, OH (US)

( * ) Notice: Subject to any disclaimer, the term of this patent is extended or adjusted under 35 U.S.C. 154(b) by 0 days.

(21) Appl. No.: 15/357,419

(22) Filed: Nov. 21, 2016

(65) Prior Publication Data

US 2017/0150581 A1     May 25, 2017

Related U.S. Application Data

(60) Provisional application No. 62/257,462, filed on Nov. 19, 2015.

(51) Int. Cl.
| | |
|---|---|
| *H04L 9/32* | (2006.01) |
| *H05B 37/02* | (2006.01) |
| *H04B 10/116* | (2013.01) |

(52) U.S. Cl.
CPC ....... *H05B 37/0272* (2013.01); *H04B 10/116* (2013.01); *H04L 9/3271* (2013.01); *H05B 37/0227* (2013.01)

(58) Field of Classification Search
CPC ............... H04L 12/2803; H04L 12/282; H04L 12/2809; H04L 2012/2841; H04L 2012/285; H04L 12/2829; H04L 63/102; H04L 67/125; H04L 67/306; G06F 1/3203; G06F 1/3209; G06F 1/325; G06F 1/329; Y02B 60/144; Y02B 20/46; H04B 10/1149; H04B 10/116; H05B 37/0254;
(Continued)

(56) References Cited

U.S. PATENT DOCUMENTS

| | | | |
|---|---|---|---|
| 2015/0263861 A1* | 9/2015 | Kumar | H04B 10/116 713/168 |
| 2015/0382435 A1* | 12/2015 | Noesner | H05B 37/0272 315/158 |

(Continued)

*Primary Examiner* — Alexander H Taningco
*Assistant Examiner* — Renan Luque
(74) *Attorney, Agent, or Firm* — Wood Herron & Evans LLP (57) ABSTRACT

A system includes a light fixture for installation at a location that is configured to be programmed to operate according to a control program. A communication interface is used for communication with the controller. An optical receiver of the fixture is configured for receiving an optical signal. The controller monitors provisioning commands received by the fixture and determines receipt of the provisioning commands in order to monitor inputs to the optical receiver and detect an optical selection signal for selecting the fixture. Upon detecting an optical selection signal the fixture processes commissioning commands. The controller, upon determining that the provisioning commands have not been received, further configured for ignoring inputs to the optical receiver so the fixture cannot be selected and programmed with commissioning commands.

16 Claims, 5 Drawing Sheets

(58) Field of Classification Search
CPC .......... H05B 37/0272; H05B 33/0845; H05B 33/0854; H05B 37/029; H05B 37/0209; H05B 37/0218; H05B 37/02; H05B 33/0806; H05B 37/0227; H05B 33/0842; H05B 33/0857; G05B 15/02; F21V 7/0008; F21V 23/008; F21V 23/0435; F21V 23/0464; F21S 8/026; F21S 9/02; F21Y 2101/00; F21Y 2103/10; F21Y 2115/10; H01L 2924/181; H01L 2224/32257; H01L 2224/48091; H01L 2224/48247; H01L 2224/73265; H01L 2924/00014; H01L 2924/00012; H02J 50/40; H02J 9/065; H02J 17/00

See application file for complete search history.

(56) References Cited

U.S. PATENT DOCUMENTS

2016/0302288 A1* 10/2016 Gotoh ................ H05B 37/0272
2018/0177031 A1* 6/2018 Yoo ................... H04M 1/72533

* cited by examiner

SYSTEM FOR COMMISSIONING ELEMENTS IN AN INSTALLATION

CROSS-REFERENCE TO RELATED CASES

This application claims the benefit of U.S. Provisional Patent Application Ser. No. 62/257,462 filed on Nov. 19, 2015, the disclosure of which is expressly incorporated by reference herein in its entirety.

FIELD OF THE INVENTION

This invention is related generally to a system for commissioning of various elements within an installation, and particularly to the commissioning of fixtures or other elements in a lighting system.

BACKGROUND OF THE INVENTION

In various industries, such as the lighting industry, it is desirable to ensure that all installed fixtures or elements of an installation, such as within a building, in a parking lot, or other area, are installed and controlled as desired. When a lighting system is activated, it is tested and the controls for the system are programmed and calibrated to ensure proper operation. The term "commissioning" is often used to generally describe such system programming, calibration, testing, and activation.

For the purposes of commissioning, it is often desirable to group certain fixtures together to be operated under a common group control protocol. To that end, it is necessary to program and control those individual fixtures to operate according to the selected group or system parameters.

Traditionally, commissioning might involve a pre-programming or pre-commissioning of each device, such as at a factory. Then, explicit instructions are provided to an installer, such as an electrician, regarding where each specific, pre-commissioned device should be located and grouped. As may be appreciated, such pre-programmed fixtures have to be individually selected for a specific location, and then installed properly at that location. This leads to installation errors and commissioning problems. As a result, quickly and accurately programming light fixtures within one or more groups is an industry-wide problem because of increased installation time and associated cost. Once installed, the fixtures also need to be associated with the proper group based on their physical location and other specific parameters, such as the direction they are facing, whether they are to be used for emergency lighting, etc.

In another scheme, bar codes have been employed to determine the fixture and then "pre-load" the configuration. This includes providing a location to an electrician responsible to place the fixture in the correct location. However, even with such precautions, the fixture may often be installed in the wrong location.

In still another commissioning technique, the fixtures might be installed first, and then the fixture individually or as part of a larger group is programmed or commissioned, once installed. However, generally such a task involves visually identifying the fixture, and then programming the fixture accordingly. It may often require two people to do such programming work. Also, such programming usually involves physical access and proximity to the fixture for engaging the fixture in a series of programming steps or sequences. As may be appreciated, certain installed fixtures may be at elevated locations and thus difficult to access. To address location issues, some systems have remote activation elements such as RF or optical remote controls. However, such devices, while offering convenience, may provide ways for the systems to be undesirably hacked and re-programmed as the fixtures are not selective with respect to the programming and control process. This can be a particularly problematic issue in today's environment of security breaches. Furthermore, it can be a particular issue if such lighting fixtures are used to illuminate secure areas or other areas where lighting is critical.

Accordingly, it is desirable to improve the overall commissioning process of systems or installations involving multiple elements, and particularly to improve the commissioning within lighting systems, including a plurality of fixtures or lighting elements. It is also desirable to ensure that improvement in the convenience of commissioning or programming a system does not lead security issues or undesired re-programming of such systems.

SUMMARY OF THE INVENTION

A system includes one or more fixtures, such as light fixtures, for installation at a location and configured to be programmed to operate according to a control program. The fixtures include control circuitry or a controller for controlling the fixture to operate according to the control program. A communication interface is used for communicating with the fixture. An optical receiver is also located with the fixture and configured for receiving an optical signal. The fixture controller evaluates first command data, such as provisioning commands, for the programming process. The controller determines receipt of the first command data or provisioning commands and monitors inputs to the optical receiver to detect an optical selection signal to select one or more fixtures to receive second command data. If the controller determines that the first command data for the fixture has not been received, the fixture ignores selection signal inputs to the optical receiver.

In another embodiment of the invention, even if first command data or provisioning commands are received, they must contain suitable security information for the controller to monitor inputs to the optical receiver to detect an optical selection signal. This provides another level of security for undesired programming or tampering with fixtures.

The second command data that is received by the fixture and processed if the fixture is selected may be commissioning commands for programming the fixture to operate according to a control program, such as a group control program. The selection signal can select fixtures to be part of a group and receive commissioning commands for the group through the communication interface. If no selection signal is detected, the commissioning commands to the fixture are ignored.

The accompanying drawings, which are incorporated in and constitute a part of this specification, illustrate embodiments of the invention and, together with a general description of the invention given below, serve to explain the principles of the invention. It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF EMBODIMENTS OF THE INVENTION

The present invention is directed to commissioning one or more fixtures or elements, such as within a group of fixtures/elements, by selecting such fixtures in a secure process and then further commissioning those fixtures that were securely selected. Once commissioned, the fixtures will operate according to a control program associated with the commissioning. In one embodiment, the system sends first command data, in the form of a group "provisioning command", to one or more of the individual fixtures or elements at a site or area. A controller, associated with a fixture, receives and evaluates or processes the first command data and provisioning command(s). Herein, the term "fixtures" will be used to refer to all operational elements or devices to be commissioned, and is not limiting. In the disclosed embodiments, such fixtures are lighting fixtures, but other fixtures might also be commissioned. That is, while the disclosure refers to the commissioning of lighting systems, other systems of one or more fixtures/elements might also be commissioned using the invention.

The controller determines if the first command or provisioning command data is received. The provisioning command from a device, such as a PC or mobile device, is used by the controller of the fixture to program the individual fixture to monitor for the receipt of a subsequent selection signal that is to be received. The selection signal that is received is then used by the fixture for becoming part of a desired group that is referenced within the provisioning command. In one embodiment, an optical selection signal is used. That is, utilizing a visible light source to generate the optical selection signal, such as a laser pointer for example, a technician or other programmer will point the light source at each of the fixtures that are to be selected or designated for the desired group. Each of the fixtures has an optical receiver circuit suitable for processing the light source signal, as an optical selection signal, and therefore, upon receipt of the first command data, the controller is configured for monitoring inputs of the optical receiver circuit to detect an optical selection signal. The receipt of the optical selection signal is communicated with the controller of the fixture to indicate that the fixture has been selected and/or added to a desired group. The controller, upon receiving the selection signal, effectively selects the fixture to receive second command data and to operate as part of a group of selected fixtures. Once all of the selected fixtures for a group have been selected and identified, the second command data, in the form of commissioning command(s), is then sent to all of the fixtures. If the controller determines that the first command data has not been received, such as when no commissioning commands are sent to the fixture, the controller is further configured for ignoring any inputs to the optical receiver circuit. That is, the fixture will ignore any optical selection signals.

Those fixtures that have been selected receive and process the second command data or group commissioning commands. The controller uses the commissioning commands to form a control program for control of the fixture. The other fixtures that have not been selected and have not detected an optical selection signal, will ignore those the second data commands or group commissioning commands for the current particular group. Subsequently, additional groups may be similarly defined, and other fixtures selected utilizing the invention, until all fixtures in an installation have been commissioned and are programmed to operate according to a selected control program. Herein, the term "control program" will be used to be reflective of those elements of software, hardware and/or firmware which will control the operation of the fixture in normal operation once it has been commissioned. Such a control program may be received all or in part in the commissioning commands sent to the fixture through the communication interface or may be resident, all or in part, with the fixture and/or fixture controller to then be activated or configured for operation upon receipt of the commissioning commands.

Figure 1:
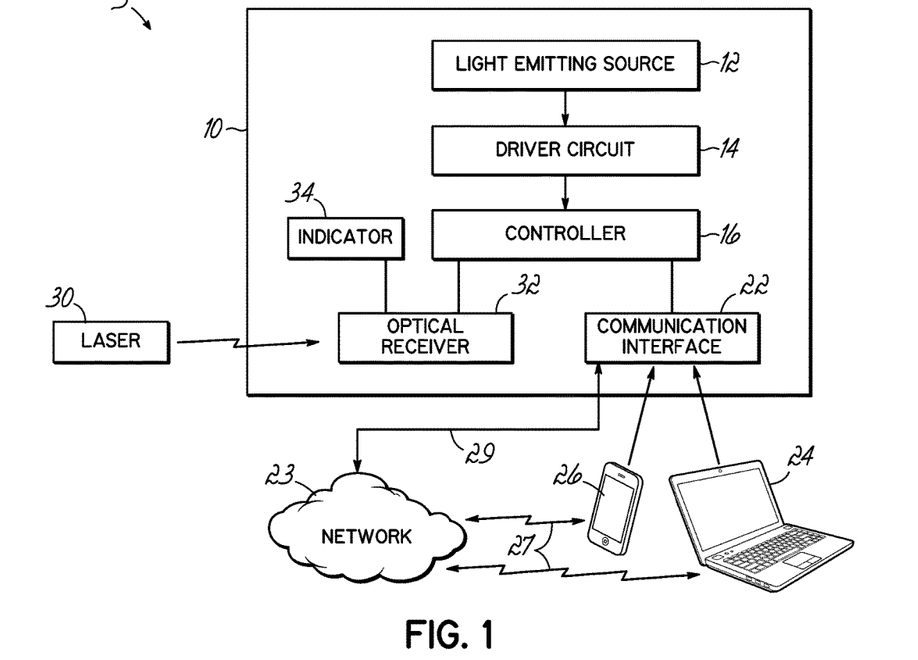
FIG. 1 is a schematic view of one embodiment of a fixture and system of the invention illustrating elements of the system.

Turning now to FIG. 1, one exemplary system 5 for implementing the invention and having a fixture 10 for use in the invention is illustrated. Fixture 10 may be a light fixture and may include a light emitting source or element 12 that provides the visible light for the fixture, such as a string of light-emitting diodes (LEDs). The exemplary fixture as discussed herein for illustration is not limiting to the invention. The light emitting source 12, often referred to as an emitter, is coupled to a suitable power supply, or driver circuit 14 that provides the necessary voltage and current for driving the light emitting source 12 or some other element of the fixture. The driver circuit 14 will often be under the control of control circuitry or a controller 16, that may include one or more processors, memory and or other suitable electronic control elements and circuitry suitable for controlling the fixture according to a control program. Herein, the term "controller" is indicative of the various processing and control elements, such as a processor, as well as any supportive elements, such as memory, that are used for operating and controlling the fixture and also running the control program for the fixture. As such, the controller can have a number of different interconnected elements, both hardware, software, and firmware (not individually shown) that provide the overall control circuitry for the fixture.

The illustration of the system 5 shows a fixture 10 that incorporates various elements such as the light emitting source, the driver circuit, the controller and other elements as discussed herein, in a common housing. For example, the fixture 10 might incorporate those elements into a unitary fixture housing. However, one or more of the elements shown for fixture 10 might be located remotely from the housing that might contain the light emitting source and driver circuit for example. As such, the invention is not limited to the specific location of various elements of the invention or the requirement for all such elements to be in a unitary housing.

Figure 2:
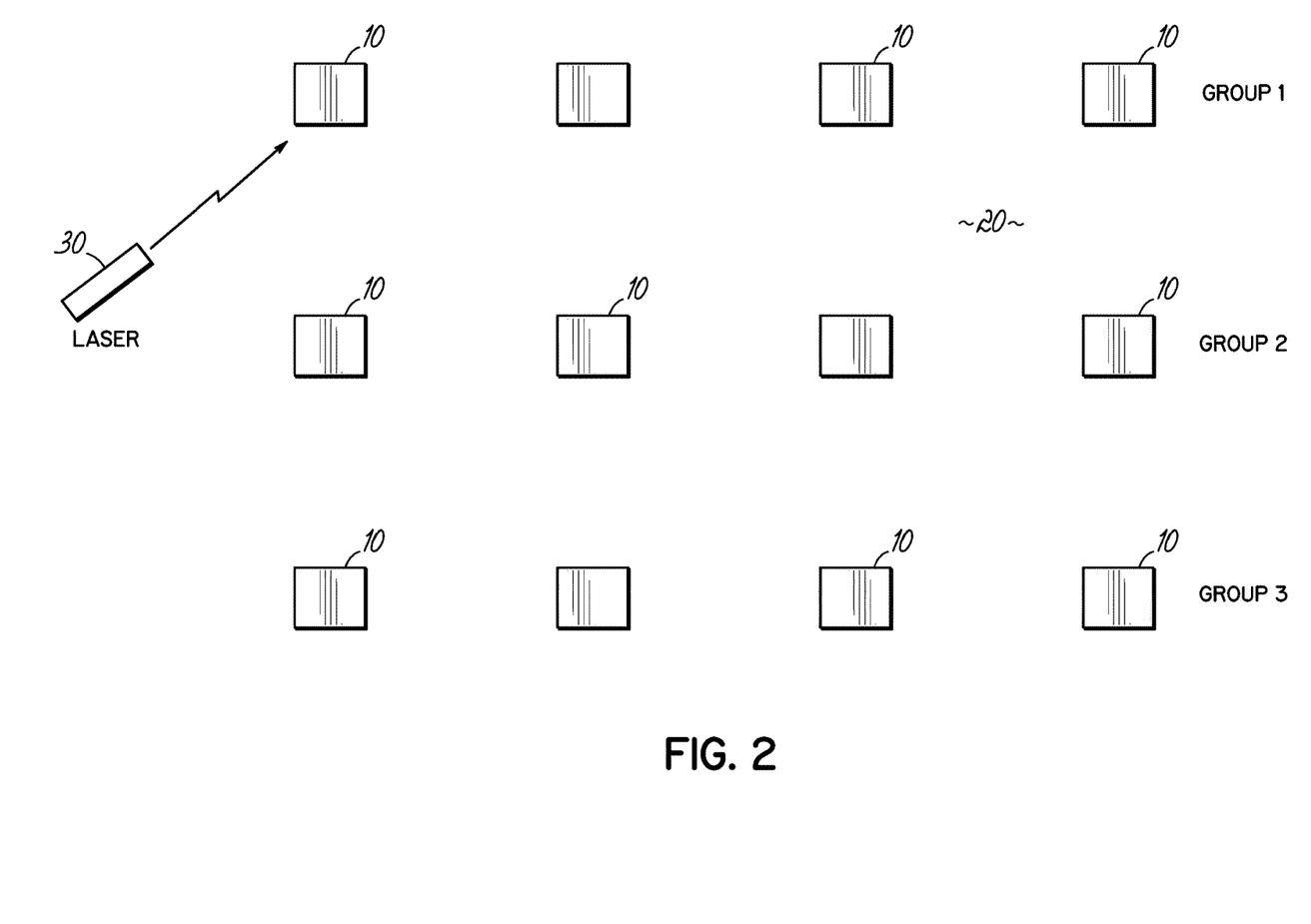
FIG. 2 is a schematic view of groups of fixtures with which an embodiment of the invention might be utilized for commissioning.
Figure 3:
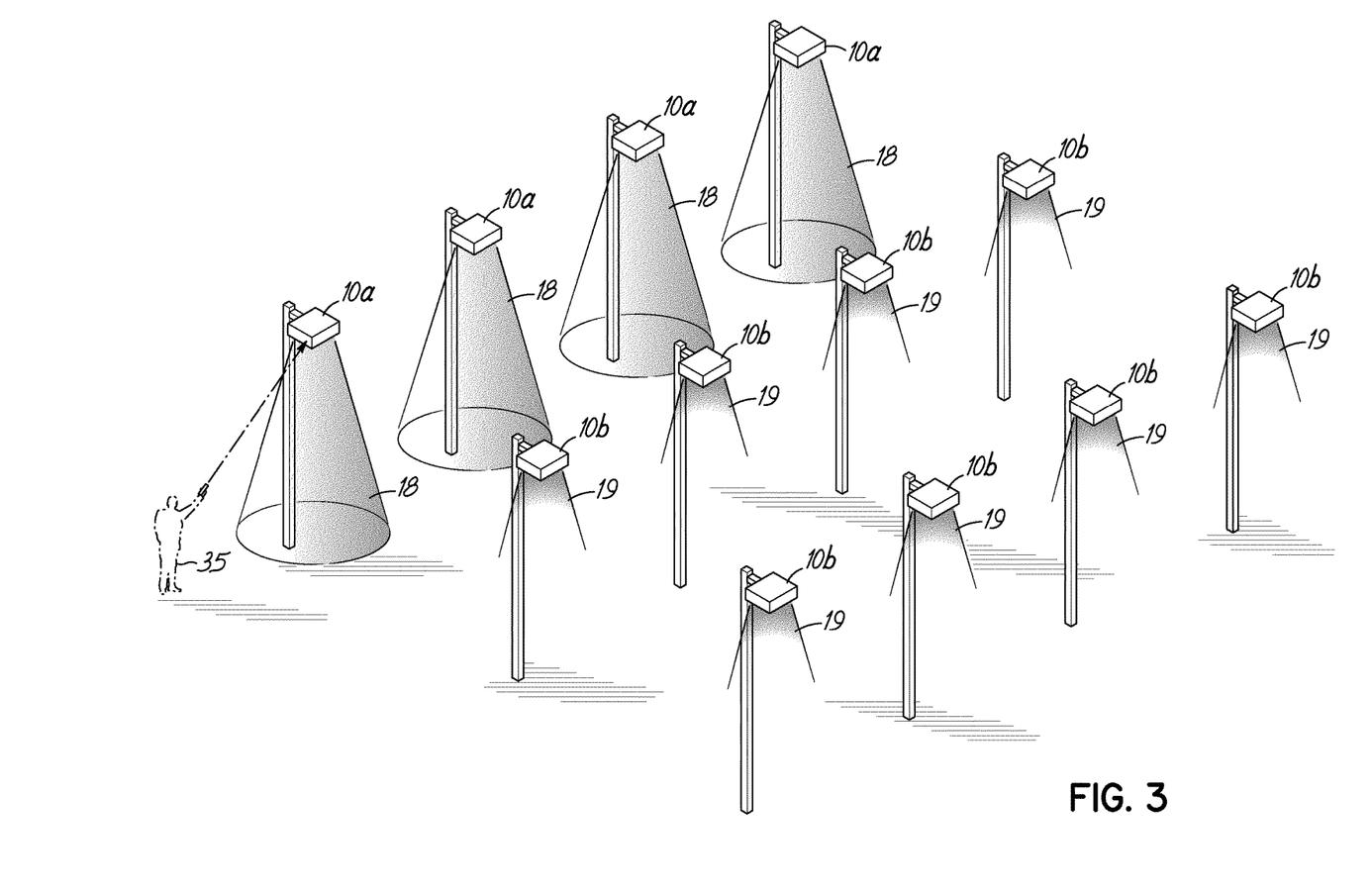
FIG. 3 is a perspective view of an installation of various fixtures showing a commissioning process for an embodiment of the invention.

In accordance with one aspect of the invention, a fixture 10 might be utilized within a larger installation, including multiple fixtures arranged in locations around the site (See FIG. 3). Various of those fixtures might be grouped to operate in accordance with a common control protocol and common control program. To that end, during commissioning, the fixtures must be recognized as part of a group, and then similarly programmed according to the control protocol/program for that group. Referring to FIG. 2, a particular installation site 20 is illustrated having different groups of multiple fixtures 10. For example, three groups are shown in FIG. 2, with each group having four fixtures 10. As will be readily understood by a person of ordinary skill in the art, the number of groups and the number of particular fixtures within each group may be varied, and the present invention is not limited by the illustrated embodiments.

For the purposes of commissioning site 20, certain of the fixtures are first grouped together, and then are appropriately programmed with commissioning commands for the purposes of determining the control programs that the fixtures will operated under. For example, as illustrated in FIG. 3, a site might be a parking lot, and one group of fixtures 10a might be grouped to operate with a higher light intensity 18 than another group of fixtures 10b with lower intensity 19. While the illustrations of FIGS. 2 and 3 are directed to groups of multiple fixtures, a group might also be defined as one fixture or a group of one. So the invention has applicability as well to commissioning a single fixture.

Referring again to FIG. 1, the system 5 includes a communication interface 22 that is coupled with controller 16. The communication can be part of the fixture 10. The communication interface 22 provides the ability for the fixture 10 to communicate with one or more control devices. In some embodiments, such control devices might be a PC 24 or mobile device 26, such as a cellular phone. The communication interface 22 might be a wired interface that is connected directly to one or more of the control devices. Alternatively, the communication interface 22 might be a wireless interface, such as an appropriate RF or radio interface that communicates with the various control devices 24, 26, either directly in a wireless link or through an appropriate network 23, such as a LAN. Using a network, the various devices 24, 26 would then interface with that network and the interface 22 through appropriate wireless links 27, 29.

Each fixture is configured to be commissioned and programmed to operate according to a control program. In accordance with one aspect of the invention, various fixtures of a group may be commissioned and programmed to operate similarly or according to a similar or the same control program. To define a group of fixtures for commissioning, command data, such as first command data, is sent to the fixture(s), such as through the communication interface 22. The first command data is received and processed by the controller. The first command data may include one or more provisioning command(s), such as from a control device 24 or 26. The provisioning command is received by the communication interface 22, and provided to controller 16. Within a large installation, the provisioning command is received by all of the fixtures of the installation.

In accordance with one aspect of the invention, the controller 16 receives the first command data or provisioning command(s), and prepares fixture 10 to receive additional input for a selection process to select the fixture to be within a certain defined group. That is, fixture 10 and controller 16 are configured, upon determining that there has been receipt of the first command data or provisioning command(s), to then look for a group selection signal that indicates that the fixture has been selected for a group. In one embodiment, the selection signal is an optical selection signal that comes from a light source or device 36. The system and fixture also includes optical receiver circuitry or an optical receiver 32. As such, the optical receiver is monitored by the controller 16 for the detection of any inputs to the optical, such as the input of an optical selection signal. The light source/device for generating an optical selection signal in one embodiment is a visible light source that has sufficient directivity to be aimed at an optical receiver. In one embodiment of the invention, as disclosed herein, the light source is a laser pointer transmitting a beam of laser light. Such beams are highly directive and can be directed at the optical receiver. The optical receiver 32 might be exposed, such as through a window formed in the fixture, so that it may receive an optical signal. In another embodiment a light source, such as a flashlight for example, having a focusing lens, might be used. The optical signal source may be any suitable device that produces a beam that is narrow and has a suitable directivity for being aimed at a small optical receiver and selecting fixtures for commissioning. The optical signal can be at visible light frequencies as well as invisible frequencies such as infrared frequencies. Therefore the invention is not necessarily limited to the laser device discussed with the examples disclosed herein. However, there may be an advantage to having the system user or technician be able to visually see what fixture is being selected.

As noted, system 5 and/or fixture 10 includes an optical receiver 32, such as a photo diode, that is coupled with controller 16. Once fixture 10 receives a provisioning command, the controller 16 monitors the optical receiver and any inputs to the optical receiver, and looks for receipt or detection of a selection signal from a light or other signal source, such as a laser signal source. The selection signal is detected by the optical receiver 32 if the controller has determined that there has been receipt of the first command data or the provisioning command. If the first command data or provisioning command has not been received, the controller ignores input signals to the optical receiver. Therefore, there is a level of security provided by the system before the fixture may be selected. In one embodiment, the controller monitors the optical receiver and processes any inputs only upon first receiving the first command data or provisioning command. In another embodiment, as discussed below, the receipt of additional security data might be required before the fixture may be selected with the optical selection signal.

As noted, for selecting fixture 10, the light source 30 is pointed such that a beam of light, such as a laser beam, is directed at the optical receiver for a fixture. The beam operates as a selection signal. Fixture 10 might also include an indicator device 34, such as an indicator light, to provide feedback to a technician that the signal from light source 30, had been received. A laser pointer is desirable as the light source 30 in one embodiment of the invention, because of the directivity of the laser light, and the ability to aim the light beam over a significant distance toward an optical receiver 32. Other light sources/devices might be used for generating a selection signal as discussed herein. The indicator device 34 might flash when fixture 10 receives the selection signal in order to acknowledge that the fixture is now selected as part of a group. Each of a number of fixtures at a site might be selected in that way to define a particular group (See FIG. 3). The flashing indicator devices 34 provide instant visual feedback to a technician 35 to confirm which fixtures are to be added to a particular group. The controller, upon receipt of a selection signal, selects the light fixture for controlling the light fixture as part of a group. The selection signal also indicates the fixture has been selected to receive second or additional command data for the control program that will control the fixture.

If a fixture 10 has been selected in error, it might also be de-selected in accordance with one feature of the invention. Particularly, again the light device 30 is engaged to direct another beam to the optical receiver 32 after fixture 10 has been selected and the indicator device is flashing. This will de-select the fixture. As such, indicator device 34 will no longer flash, and the fixture will be indicated to a technician 35 as not selected for the particular group. Various fixtures may be, therefore, appropriately toggled as selected or unselected, until the desired group is attained.

In accordance with another feature of the invention, once the group has been defined, further commissioning can take place and data transferred to the controller and fixture for providing a control program for the fixture. In accordance with one embodiment, once the security step of receiving the first command data has been completed, and the fixture has then subsequently been selected, the controller is configured for processing second or additional command data for the control program for the fixture. For example, second or additional command data may be received by the controller and fixture through the communication interface 22. In one embodiment, that second command data is additional commissioning commands that are sent to controller 16 through communication interface 22, such as from a PC 24, mobile device 26 or some other element or device. Those commissioning commands may be sent to all the fixtures in a site. However, according to the invention, only those fixtures 10 which have been properly selected will implement or process and use the received commissioning commands to further program a controller for operating according to a control program. The control program is used by the controller and fixture for controlling the driver circuit 14 and the light emitting source 12 of the fixture for the group. The commissioning commands might provide all or part of a control program for the fixture. Also, the commissioning commands might modify all or part of control program that is already resident on a fixture, such as part of the controller. That is, all of the selected fixtures 10 may be commissioned as part of the group, and the controller is programmed accordingly to operate under a common group control protocol or group control program. Those fixtures that are not selected and had not detected a selection signal will simply ignore the subsequently received second command data or group commissioning commands, and will not be affected. Rather, those additional fixtures will remain ready to be selected for other groups to possibly receive and operate.

In that way, Group 1, Group 2, and Group 3, etc. might be selected with the appropriate fixtures being commissioned and programmed as desired for those groups. When Group 1 is selected, the Group 1 fixtures will respond to the subsequent group commissioning commands, whereas Groups 2 and 3 will ignore those commands. Then, when Group 2 is configured, again the provisioning commands are sent to all of the fixtures so that those fixtures then are not part of another group are then ready to be selected utilizing the pointable light source or laser device 30 of the invention. Group 2 fixtures may then be selected, and then subsequently commissioned with Group 2 commissioning commands that are only acted upon by the controllers of the selected Group 2 fixtures. Similarly, Group 3 or any other remaining groups might be commissioned in accordance with the invention.

Figure 4:
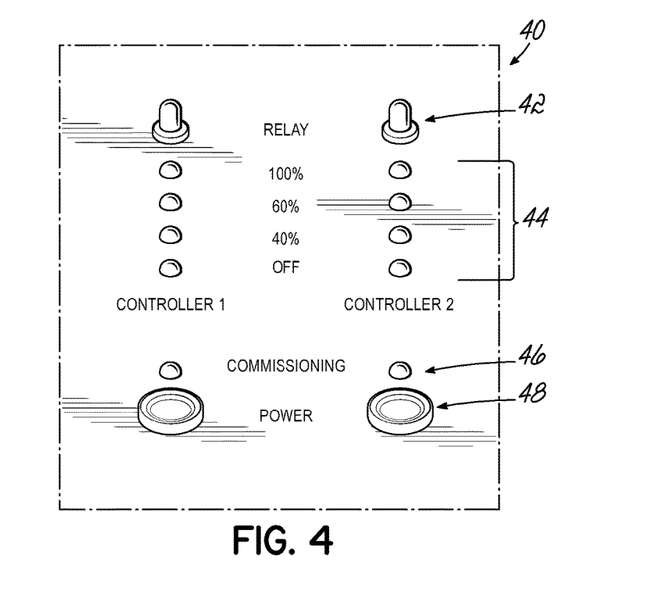
FIG. 4 is a plan view of a control panel for a fixture in accordance with an embodiment the invention.

FIG. 4 illustrates one possible control panel for the fixture 10 in accordance with the invention. The control panel 40 in FIG. 4 illustrates indicators and control elements for two fixtures. To that end, control panel 40 might incorporate relay indicators 42 that indicate that the light emitting source of a fixture is ON or OFF. Level indicators 44 might indicate particular dimming levels, and also the ON/OFF state of a fixture. Commissioning receivers 46, such as an appropriate optical receiver/photo diode are provided and are exposed for receiving a laser or light signal or other selection signal in accordance with the invention in order to select and commission and program each of the fixtures associated with control panel 40. Similarly, power switches 48 might be provided for powering the fixtures ON or OFF directly.

Figure 5:
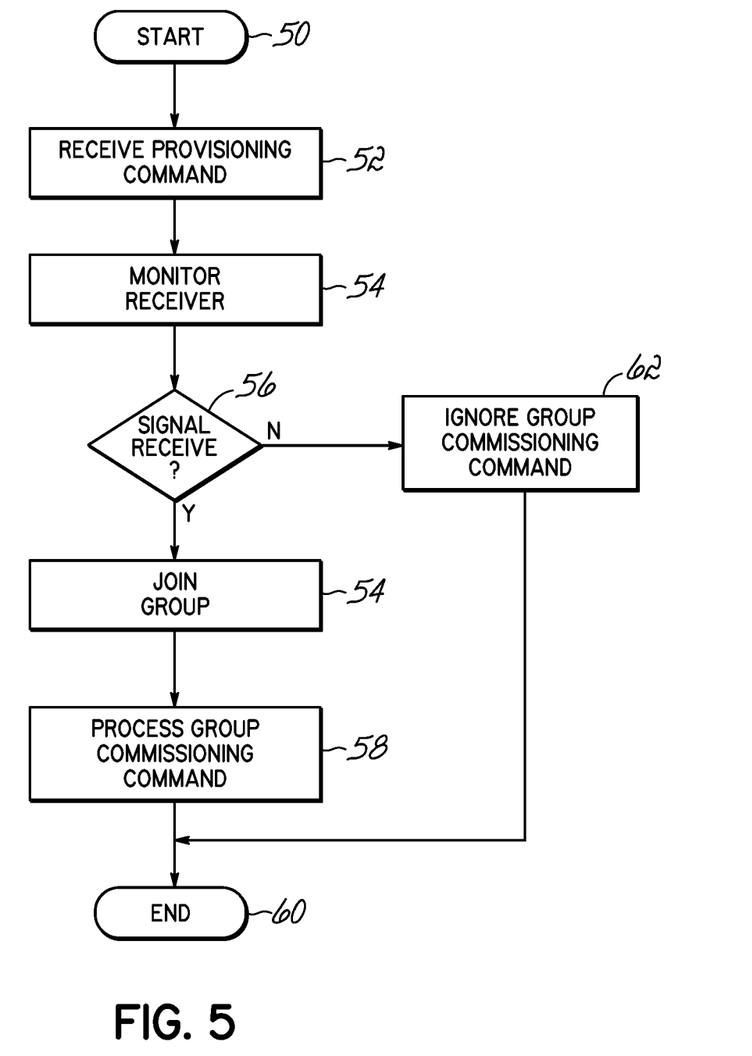
FIG. 5 is a schematic view of a flowchart control process in accordance with an embodiment the invention.

FIG. 5 illustrates a flow chart for one embodiment of the invention regarding the operation of fixture 10 during a commissioning process in accordance with the invention. The process starts with block 50 upon the fixture receiving first command data, such as one or more provisioning commands, from a mobile device, PC or other device (block 52). Upon the determination of the receipt of the provisioning command data, all fixtures monitor their respective receivers, such as optical receivers 32, for detection of a selection signal, such as an optical selection signal from a light source or laser pointer 30 (block 54). If the controller determines that the first command data or provisioning command data has not been received, then any inputs to the optical receiver are ignored. That is, the fixture cannot be selected and then subsequently commissioned or controlled according to a particular control program until the first command data or provisioning command is received. This provides a level of security to the fixture in commissioning the fixture.

If however, the provisioning command data is received, then additional monitoring at the fixture includes the determination that the selection signal is received (block 56). If the selection signal is received as illustrated by the YES branch for block 56, then a particular fixture is selected to receive additional command data or second command data. In one aspect, the fixture is considered part of a group of selected fixtures, associated with the receipt of a selection signal (block 58). Then, upon subsequently receiving the additional or second command data, such as a group commissioning command, from a mobile device, PC or other device, the one or more commissioning commands are processed (block 60) so that the controller 16 of a fixture 10 is appropriately programmed to operate according to an appropriate control program for the fixture, such as a control program or operational protocol for the selected group. The process is then complete, and the fixtures are appropriately commissioned and programmed to operate according to a control program.

If the optical receiver is configured for further monitoring (based on receiving provisioning command data) and no selection signal is received, then any group commissioning command that is received for the fixtures will be ignored by those fixtures that are not previously selected (block 62). The controller 16, or other processor or processing circuitry of fixture 10, may be programmed appropriately with software for executing the program of FIG. 5 in accordance with the invention.

Figure 6:
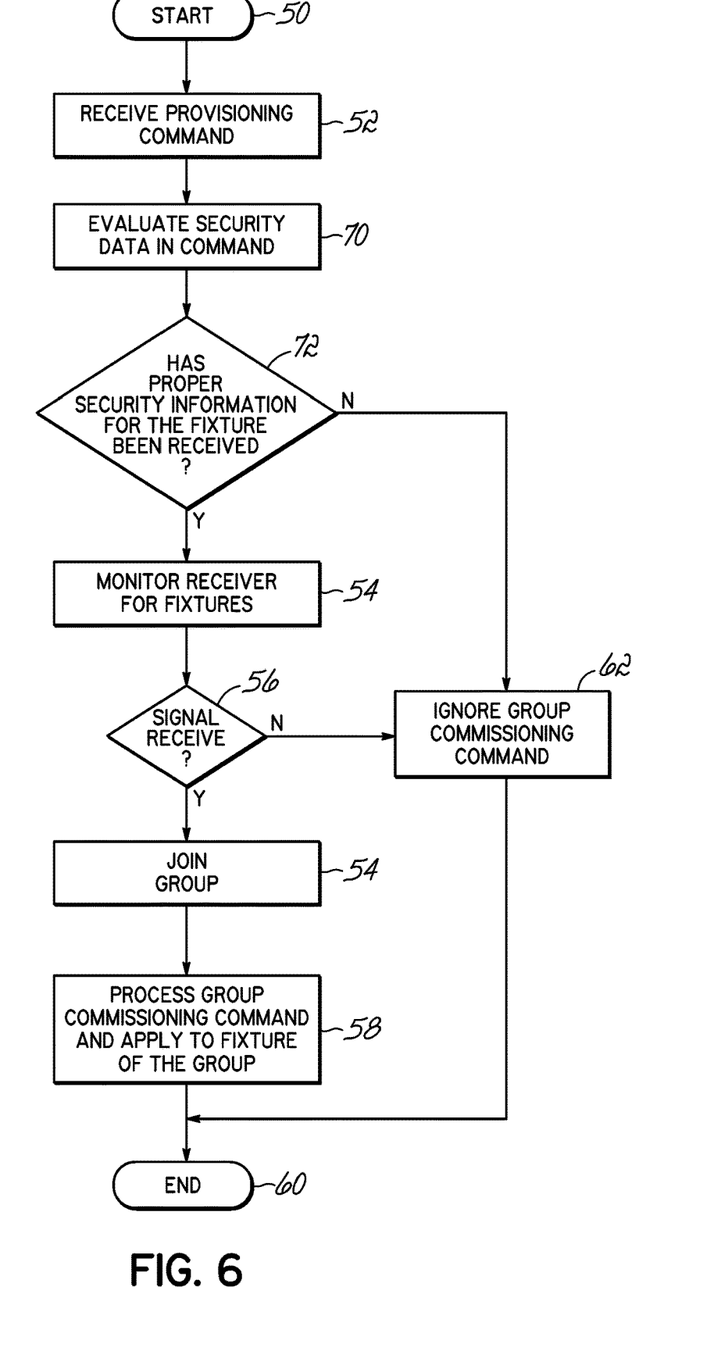
FIG. 6 is a schematic view of a flowchart control process in accordance with another embodiment the invention.

FIG. 6 illustrates a flow chart for another embodiment of the invention regarding the operation of fixture 10 during a commissioning process in accordance with the invention.

Specifically, an additional step of security is added in order to determine that there is specific security data for the fixture in any first command data or provisioning commands in order to configure the fixture for monitoring for a selection signal in accordance with the invention in order to be selected. The process starts with block 50 upon the fixture receiving first command data, such as one or more provisioning commands, from a mobile device, PC or other device (block 52). However, upon the determination of the receipt of the provisioning command data, rather than have certain fixtures monitor their respective receivers, such as optical receivers 32, for detection of a selection signal, an additional step of evaluating the first command data or provisioning commands is taken to determine that certain security data is in the command data or provisioning commands (step 70). For example, each fixture may be programmed to require that a provisioning command have security data that is associated with that fixture. Then a determination is made regarding whether the received command data or provisioning commands have the proper security information for the fixture (step 72). If not, then similar to the scenario where the proper first command data or provisioning commands are not received, any further inputs to the optical receiver are ignored and the fixture cannot be selected. As such, any additional command data or commissioning commands are ignored by the fixture (step 62). Again, if the controller determines that the first command data or provisioning command data has not been received, then any inputs to the optical receiver are ignored. That is, the fixture cannot be selected and then subsequently commissioned or controlled according to a particular control program until the first command data or provisioning command is received.

If however, the provisioning command data is received (step 52), and that provisioning command data, upon being evaluated, has the proper security information for the fixture (YES, step 72) then additional monitoring at the fixture is undertaken to determine if a selection signal is received (Step 54). If the selection signal is received as illustrated by the YES branch for block 56, then a particular fixture is selected to receive additional command data or second command data. In one aspect, the fixture is considered part of a group of selected fixtures, associated with the receipt of a selection signal (block 58). Then, upon subsequently receiving the additional or second command data, such as a group commissioning command, from a mobile device, PC or other device, the one or more commissioning commands are processed (block 60) so that the controller 16 of a fixture 10 is appropriately programmed to operate according to an appropriate control program for the fixture, such as a control program or operational protocol for the selected group. The process is then complete, and the fixtures are appropriately commissioned and programmed to operate according to a control program.

If the optical receiver is configured for further monitoring (based on receiving provisioning command data with the proper security data) and no selection signal is received, then any group commissioning command that is received for the fixtures will be ignored by those fixtures that are not previously selected (block 62). The controller 16, or other processor or processing circuitry of fixture 10, may be programmed appropriately with software for executing the program of FIG. 6 in accordance with the invention.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A system comprising:
   a plurality of fixtures for installation at a location, selected ones of the plurality of fixtures configured to be programmed in a group of fixtures to operate according to a control program for the group of fixtures;
   each fixture including:
   a controller coupled with the fixture for controlling the at least one fixture to operate according to the control program;
   a communication interface, coupled with the controller, for receiving data to be utilized by the controller;
   an optical receiver located with the at least one fixture and configured for receiving an optical signal;
   the controller of each of the plurality of fixtures configured for evaluating the data including first command data that is sent to a corresponding fixture of the plurality of fixtures to be programmed and upon determining receipt of the first command data by the corresponding fixture, further configured for monitoring inputs to the optical receiver for the corresponding fixture to detect an optical selection signal,
   the controllers, upon detecting the optical selection signals for one or more of the plurality of fixtures, then selecting certain ones of the plurality of fixtures to be selected fixtures within a group to be further programmed;
   the plurality of fixtures subsequently receiving second command data for the control program through respective communication interfaces;
   the controllers of the selected fixtures for the group being configured for processing the second command data for further programming the selected fixtures, and the controllers of fixtures not selected for the group being configured for ignoring the second command data;
   the controller of each of the plurality of fixtures, upon determining that the first command data has not been received, further being configured for ignoring inputs to the optical receiver to prevent the corresponding fixture from being selected.

2. The system of claim 1, wherein the controller evaluates at least some of the first command data to determine the existence of security data, the controller configured for monitoring inputs to the optical receiver only when the security data is present.

3. The system of claim 1, wherein the first command data includes at least one provisioning command.

4. The system of claim 2, wherein the first command data includes at least one provisioning command, the at least one provisioning command including the security data.

5. The system of claim 1 wherein the second command data includes at least one commissioning command that is utilized for the control program for the fixture.

6. The system of claim 1, further comprising at least one device for providing second command data to the controller through the communication interface.

7. The system of claim 1 further comprising a driver circuit coupled with the controller, the controller controlling the driver circuit according to a control program.

8. The system of claim 1 wherein the fixture includes a light source.

9. The system of claim 1 further comprising an indicator light coupled with the controller for indicating receipt of the optical selection signal by the optical receiver.

10. The system of claim 1 wherein the fixture, controller and communication interface are located in a common housing.

11. A system comprising:
a plurality of fixtures with each fixture including a light source, a controller for controlling the light source according to a control program, a communication interface and an optical receiver;
a commissioning device configured for communicating with the plurality of fixtures through the respective communication interfaces for commissioning selected fixtures as a group, the commissioning device configured for sending data including first command data to the plurality of fixtures;
the controller of each of the plurality of fixtures, upon receipt of the first command data, configured for monitoring inputs to the optical receiver for the corresponding fixture to detect an optical selection signal, and upon the detection of an optical selection signal for selecting that corresponding fixture among the plurality of fixtures to be within a group to be further programmed;
the plurality of fixtures subsequently receiving second command data for the control program through respective communication interfaces;
the controllers of the selected fixtures for the group being configured for processing the second command data for further programming the selected fixtures, and the controllers of fixtures not selected for the group being configured for ignoring the second command data;
the controller of each of the plurality of fixtures, upon determining that the first command data has not been received, further being configured for ignoring inputs to the optical receiver to prevent the corresponding fixture from being selected.

12. The system of claim 11, wherein the controller evaluates at least some of the first command data to determine the existence of security data, the controller configured for monitoring inputs to the optical receiver only when the security data is present.

13. The system of claim 11, wherein the first command data includes at least one provisioning command.

14. The system of claim 11 wherein the second command data includes at least one commissioning command that is utilized for the control program for the fixture.

15. The system of claim 11 further comprising an indicator light coupled with the controller for indicating receipt of the optical selection signal by the optical receiver.

16. The system of claim 11 wherein the light source, controller and communication interface are located in a common housing.

* * * * *